J. POWELL.
Globe-Cocks.
No. 6,527. Reissued July 6, 1875.
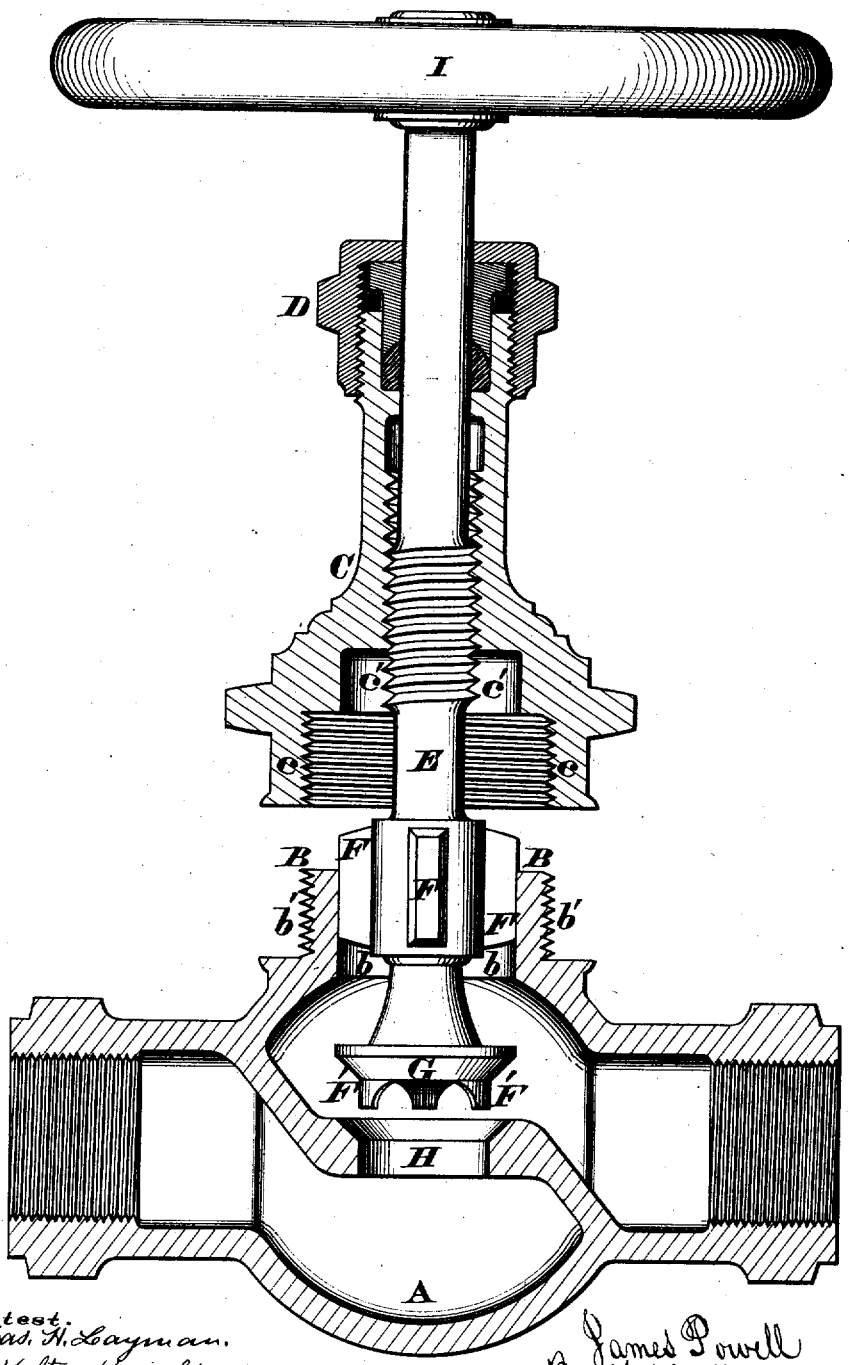
Attest.
Jas. H. Layman.
Walter Knight
James Powell
By Knight Bros. Att'ys.
N. PETERS, PHOTO-LITHOGRAPHER, WASHINGTON, D. C.

UNITED STATES PATENT OFFICE.

JAMES POWELL, OF CINCINNATI, OHIO.

IMPROVEMENT IN GLOBE-COCKS.

Specification forming part of Letters Patent No. 47,565, dated May 2, 1865; reissue No. 6,527, dated July 6, 1875; application filed May 14, 1875.

*To all whom it may concern:*

Be it known that I, JAMES POWELL, of Cincinnati, Hamilton county, Ohio, have invented a new and useful Improvement in Globe-Cocks, of which the following is a specification:

My invention relates to the class of cocks commonly known as "globe-valves," in which a screw cut upon the valve-stem is employed to close or press the valve down upon its seat, or to elevate it therefrom, as may become necessary; and my invention consists in a mode of constructing such cocks, which enables the accurate and expeditious grinding of the valve to its seat, and also of regrinding the same when worn irregularly by use, the above objects being attained without adding to the number or expense of parts composing the cock, and without the necessity of detaching the cock from the parts with which it is connected in use.

I will now proceed to refer briefly to the construction of such valves made or proposed previous to my invention.

First, in the common globe valve or cock the valve proper is guided to its seat wholly by means of the thread on the interior of the screw-chamber, which thread is not, and cannot be, used to guide the valve in the act of grinding, a temporary plug being employed for that purpose. In this class of valves the mode of construction demands an exact agreement of centers between the screw-chamber and the valve proper when the latter is seated, and such precise agreement being very difficult to attain, leakage is a frequent result. This inaccuracy is due in part to the difficulty of forming a screw-thread perfectly concentric with the cylinder on which it is cut.

Second, in other cases attempts have been made to enable the regrinding of the valve to its seat or bearing by constructing the screw-spindle, which raises and lowers the valve, with a central opening through its entire length, the valve having been retained to the axial position by means of a slender stem, which occupied said opening, and was held in place by a screw-nut or a pin above the handle. The construction of globe-valves of this class involved great labor and nice fitting by a skilled hand to insure a tight joint between the valve and seat, and for the act of regrinding necessitated the detachment of the wheel or handle from the valve-stem, and the use of an extra wrench upon said stem.

Third, in yet other globe-valves it has been attempted to accomplish the guiding of the valve by constructing the nut through which the screw-stem passes in a separate piece from the part which screws onto the neck or body of the globe, and having said nut to fit the interior of the neck of the globe, so as to be used as a guide when released by unscrewing the cap which held it in place. In such valves, however, the guiding of the valve-stem is secured only by means of the screw-nut, and in the act of grinding small particles of dirt or sand are apt to get between the nut and the neck of the valve-body, and instead of the nut rotating with the stem it sticks fast, and the stem is forced from its bearing.

Moreover, in valves of the second and third classes, above referred to, no provision is made for guiding the lower end of the valve-stem, to prevent lateral displacement or oscillation while in the act of grinding, except what is afforded by the beveled sides of the valve-seat itself.

The heretofore customary construction of globe-valves required each valve proper to be carefully fitted to its proper body, to which alone it was applicable, whereas cocks made on my plan may be composed of pieces taken at random without selection, or any tedious co-adaptation of the screw-stem and seat to bring them into line.

The accompanying drawing is an axial section of a globe valve or cock embodying my invention.

The body A of the cock has a neck, B, having a smooth cylindrical interior, *b*, and a screw-threaded exterior, *b'*, which exterior receives the interiorly screw-threaded chamber or nut C *c*, which chamber is surmounted by a customary stuffing-box, D. The valve-stem E is provided with three or more wings, F, which fit and slide snugly within the cylindrical interior of the neck, while yet other wings F' beneath the valve proper G occupy the cylindrical passage-way H below the beveled sides of the valve-seat. It will be seen that said wings and their inclosing-cylinders discharge the entire duty of guiding the valve-stem and

BEST AVAILABLE COPY holding the same in a true line with the seat, irrespective of the screw-chamber or nut C *c*, which is, consequently, not required to be so accurately in line as in valves of previous construction.

The screw-chamber or nut C *c* may have on its under side a cavity, *c'*, to receive the wings F, when the stem is fully retracted.

When it is desired to grind the valve to its seat the screw-chamber C *c* is unscrewed, as in the drawing, and the valve is momentarily withdrawn to receive the sand and water or other abradant, and, being returned to its place, the grinding is effected by grasping the handle I and vibrating the same back and forth with a downward pressure.

It will be seen that the wings F and F' which are to guide the valve in actual use, are the very same which hold it to a truly axial position, and prevent any wabbling or lateral displacement in the act of grinding, as above.

It will also be seen that the valve may at any moment, during the operation of grinding or of regrinding, be momentarily withdrawn for the introduction of the grinding material or abradant.

It is also apparent that by my mode of construction the bodies and various parts of my valves may be made separately in large numbers and quickly fitted together without the labor of selection.

I have selected to illustrate my invention a form which I have found efficient in actual use, but do not propose to restrict myself to the precise arrangement represented so long as I obtain the same results—by means substantially equivalent, for example:

Instead of the upper wings F, the valve-stem may be provided with a collar fitting the cylindrical interior of the neck B, while the lower wings F' may be replaced by a slender axial prolongation occupying sockets in the body or globe.

I am aware that it has been common to construct globe-cocks—as, for example, in the forms above alluded to—so that their valve-stems may be held in a perpendicular position during the operation of grinding; but I know of no instance in which these results have been attained with a valve-stem and valve adapted to be fitted and guided independently of its screw-chamber or nut, and without the aid of an auxiliary or additional temporary piece; nor have I previously known of a valve and stem so guided whose grinding action did not necessitate the removal of the wheel or handle at the top or outer extremity of the valve-stem.

I am also aware that valves of the first class (here designated as the "common" valve) have been made with guide-wings on the bottom of the valve or valve-stem, which have occupied the passage-way of the valve-seat. Such valves have, however, been ineffective for the purpose of grinding, for want of guiding means at the upper portion of the valve-stem; but I know of no instance in which the valve-stem has been provided with guides both above and below the valve.

I claim as new and of my invention herein—

1. The combined valve and valve-stem E G, constructed as set forth and guided in the smooth neck B of the body, substantially in the manner designated.

2. The valve-stem of a globe-cock, provided with wings (or collar) F, combined with the neck of the globe or body, in the manner substantially as set forth, and for the purpose designated.

3. The valve of a globe-cock, provided with downward projections F', in combination with the passage-way H and a valve-stem guided at its upper end.

4. The described combination of a guided valve, G, passage H, stem E, neck B, and permanent handle I, substantially as and for the purpose set forth.

In testimony of which invention I hereunto set my hand.

JAMES POWELL.

Attest:
GEO. H. KNIGHT,
WALTER H. KNIGHT.